United States Patent
Lee (10) Patent No.: US 11,310,677 B2
(45) Date of Patent: Apr. 19, 2022

(54) METHOD FOR SELECTING PACKET PROCESSING FUNCTION AND DEVICE THEREFOR

(71) Applicant: SK TELECOM CO., LTD., Seoul (KR)

(72) Inventor: Dongjin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 111 days.

(21) Appl. No.: 16/652,881

(22) PCT Filed: Oct. 11, 2018

(86) PCT No.: PCT/KR2018/011946
§ 371 (c)(1),
(2) Date: Apr. 1, 2020

(87) PCT Pub. No.: WO2019/078539
PCT Pub. Date: Apr. 25, 2019

(65) Prior Publication Data
US 2020/0252810 A1  Aug. 6, 2020

(30) Foreign Application Priority Data

Oct. 18, 2017 (KR) .................. 10-2017-0135219

(51) Int. Cl.
*H04W 24/02* (2009.01)
*H04L 1/20* (2006.01)
(Continued)

(52) U.S. Cl.
CPC .............. *H04W 24/02* (2013.01); *H04L 1/20* (2013.01); *H04L 47/20* (2013.01); *H04W 24/08* (2013.01); *H04W 36/30* (2013.01)

(58) Field of Classification Search
CPC ........ H04W 24/02; H04W 24/08; H04L 1/20; H04L 47/20
See application file for complete search history.

(56) References Cited

U.S. PATENT DOCUMENTS

2007/0293239 A1* 12/2007 Dawson .............. H04W 80/085
455/456.1
2015/0124622 A1* 5/2015 Kovvali .............. H04L 67/1006
370/236
(Continued)

FOREIGN PATENT DOCUMENTS

KR  10-2004-0051546 A  6/2004
KR  10-2009-0088754 A  8/2009
(Continued)

OTHER PUBLICATIONS

PCT International Search Report and Written Opinion, PCT/KR2018/011946, dated Jan. 17, 2019, 10 pages.

*Primary Examiner* — Mohammad S Anwar
(74) *Attorney, Agent, or Firm* — Fenwick & West LLP (57) ABSTRACT

The present disclosure in some embodiments relates to a method of selecting a packet processing function and an apparatus therefor, which select a packet processing device that can maximize data transmission efficiency based on state information of a communication interface formed between the packet processing device and a control plane device and thereby providing a constant high-quality network service.

10 Claims, 5 Drawing Sheets

(51) Int. Cl.
 *H04L 12/813* (2013.01)
 *H04W 24/08* (2009.01)
 *H04W 36/30* (2009.01)
 *H04L 47/20* (2022.01)

(56) References Cited

U.S. PATENT DOCUMENTS

2017/0288972 A1 10/2017 Li
2019/0104045 A1* 4/2019 Singhal ................ H04L 43/062

FOREIGN PATENT DOCUMENTS

KR 10-2016-0129896 A 11/2016
WO WO 2017-173404 A1 10/2017

* cited by examiner

METHOD FOR SELECTING PACKET PROCESSING FUNCTION AND DEVICE THEREFOR

TECHNICAL FIELD

The present disclosure in some embodiments relates to a method of selecting a packet processing function and an apparatus therefor. More particularly, the present disclosure relates to a method and apparatus for selecting a packet processing device to maximize data transmission efficiency based on state information of a communication interface.

BACKGROUND

The statements in this section merely provide background information related to the present disclosure and do not necessarily constitute prior art.

The 3rd Generation Partnership Project (3GPP), which is conducting 5G standardization, is discussing the mobile core network system and the mobile access network system with the aim of commercializing 5G in 2020. In particular, System Architecture 2 Working Group (SA2 WG) is standardizing the structure and function of the 5G core network under the name of NextGen.

Figure 1:
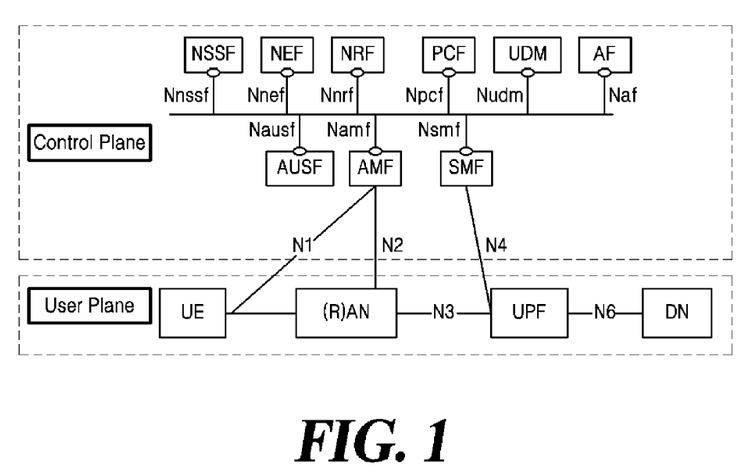
FIG. 1 is a diagram illustrating a basic structure of a 5G core network.

FIG. 1 is a diagram illustrating a basic structure of a 5G core network.

As shown in FIG. 1, a 5G core network has a data plane including a user plane function (UPF) and a control plane that are separated from each other. The 5G core network provides an environment for using Network Function Virtualization/Software Defined Networking (NFV/SDN) technology and provides convenience for network design and operation by eliminating the dependency of UPF on a physical location.

Recently, various performances are required for UPF according to user and service characteristics. In addition, 5G core networks are provided with a plurality of UPFs that support differentiated packet processing functions in practice. Meanwhile, a user plane function (UPF) defined in a 5G core network is required to process packets at high speed and very low delay. To this end, the conventional method has selected an appropriate UPF in consideration of regional information and policy information. However, the conventional UPF selection method extends no concern practically to address the performance delay that may occur in the signaling procedure between the UPF and the control plane and the resultant reduction of data transmission efficiency.

A communication interface is formed between the UPF and the control plane for interworking with each other. In other words, the state of such a communication interface may serve as an important factor in determining the performance of the signaling procedure between the UPF and the control plane and further the data transmission efficiency on the 5G core network. Accordingly, there is a need for a new technology for providing a higher quality network service by additionally utilizing the state information on the communication interface formed between the UPF and the control plane as an index for selecting the UPF.

DISCLOSURE

Technical Problem

At least one embodiment of the present disclosure seeks to select a packet processing device that maximizes data transmission efficiency by a network entity device in consideration of state information on a communication interface formed between the packet processing device and the control plane device and thereby providing a constant high-quality network service.

SUMMARY

At least one aspect of the present disclosure provides a network entity device including a collection unit, a selection unit, and an output unit. The collection unit is configured to collect state information of a communication interface formed between a control plane device and each of at least one or more packet processing devices in a wireless communication network. The selection unit is configured to make a determination of the signal quality of the communication interface for each of the packet processing devices based on the state information and to select any one of the packet processing devices according to a result of the determination. The output unit is configured to output selection information of a selection of the one packet processing device.

Another aspect of the present disclosure provides a method performed by a network entity device for selecting a packet processing function, the method including collecting state information of a communication interface formed between a control plane device and each of at least one or more packet processing devices in a wireless communication network, making a determination of a signal quality of the communication interface for each of the packet processing devices based on the state information, and selecting any one of the packet processing devices according to a result of the determination and outputting selection information of a selection of the one packet processing device.

Advantageous Effects

As described above, at least one embodiment of the present disclosure can select a packet processing device that maximizes data transmission efficiency by a network entity device in consideration of the state information on a communication interface formed between the packet processing device and the control plane device and thereby effecting a constant high-quality network service.

DETAILED DESCRIPTION

Hereinafter, some embodiments of the present disclosure will be described in detail through exemplary drawings.

Figure 2:
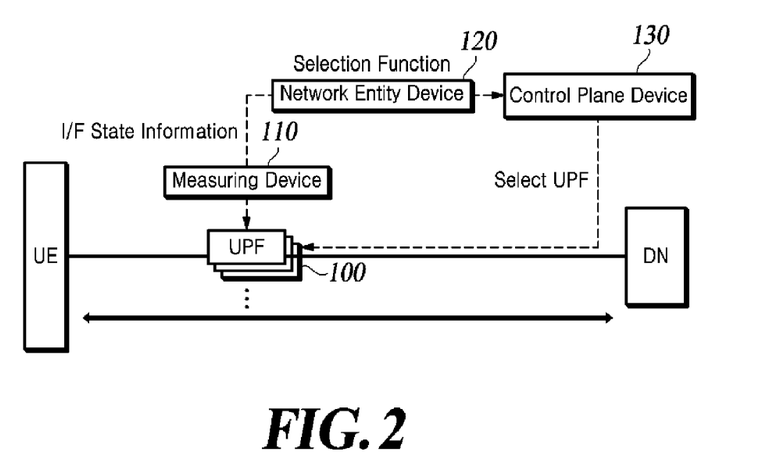
FIG. 2 is a diagram illustrating a network system according to at least one embodiment of the present disclosure.

FIG. 2 is a diagram illustrating a network system according to at least one embodiment of the present disclosure.

As shown in FIG. 2, the network system according to at least one embodiment is implemented in a form including a plurality of packet processing devices 100, a measuring device 110, a network entity device 120, and a control plane device 130. At this time, the components included in the network system according to the present disclosure are not necessarily limited thereto. FIG. 2 illustrates only the main components related to performing a method of selecting a packet processing function according to at least one embodiment among various components included in the network system, and it should be appreciated that this configuration is the same as that of the 5G core network shown in FIG. 1.

The packet processing device 100 refers to an apparatus that supports various functions related to packet processing. The packet processing device 100 may be a user plane function (UPF) of the components of the 5G core network shown in FIG. 1.

The packet processing device 100 supports such functions as an anchor point for Intra/Inter-RAT mobility, an external PDU session point of an interconnection to a data network, packet routing and forwarding, a user plane portion of packet inspection and policy rule enforcement, traffic usage reporting, uplink classification for supporting traffic flow routing to a data network, uplink traffic verification, downlink packet buffering, and downlink data notification triggering.

The packet processing device 100 may be implemented in the form of a single virtualized network device installed with the above functions in software. It may be implemented as a virtual node rather than a physical node.

A plurality of packet processing devices 100 may be arranged on a network, and they may be implemented to support packet processing functions to which policies of different types are applied respectively.

To select or not to select the packet processing device 100 may be determined under the control of the control plane device 130, for example, a Session Management Function (SMF).

In at least one embodiment, whether or not to select the packet processing device 100 may be determined by default based on region information and policy information, etc., while the decision may use a new distinctive method. For example, the packet processing device 100 according to at least one embodiment may be determined to be selected or not according to the state information on the communication interface formed between the packet processing device 100 and the control plane device 130.

The measuring device 110 refers to an apparatus for measuring in real-time the state of the communication interface formed between the packet processing device 100 and the control plane device 130. Such a measuring device 110 may be preferably installed around the packet processing devices 100, and a measuring device may be provided for each packet processing device 100.

The measurement device 110 may measure the state of the communication interface through interworking with the packet processing device 100 but is not necessarily limited thereto. In another embodiment, the measuring device 110 may measure the state of the communication interface through interworking and triggering with an external management plane and other network functions (NFs) rather than the session management function (SMF). In addition, at least one embodiment does not limit the measuring of the state of the communication interface by the measuring device 110 to a specific method.

On the other hand, in at least one embodiment, the packet processing device 100 may be provided internally thereof with other multiple communication (subcommunication) interfaces formed between other devices in addition to the communication interface formed between the control plane device 130. Accordingly, the measuring device 110 may additionally measure and provide the states of those communication interfaces. In this case, the respective other multiple communication interfaces may be the interfaces of the packet processing device illustrated in FIG. 1, that is, N3, N6, and N9, and the pieces of information on those communication interfaces may be provided through an interface N4 to be measured by the measuring device 110.

The measuring device 110 may collect state information of at least one of states among a type, a speed, a latency, and a load of a communication interface formed between the control plane device 130 and each of the packet processing devices 100. At this time, the type of communication interface may include a physical type (e.g., wired→optical cable, copper cable, etc. and wireless→WiFi), physical module (e.g., optical transceiver, RJ45 transceiver), physical port number (e.g., port 1, port 2), combined physical/logical information (e.g., four 10 GbE LAN cables combined, active-standby/active-active redundancy structure), and logical identification information (e.g., Eth1, wlan1, br1, etc.).

In addition, the speed of the communication interface may include bandwidth (e.g., bandwidth 1 Gb/s, 10 Gb/s, etc.), transmission rate (e.g., throughput 10 Mb/s, 1 Gb/s, etc.), and the total rate of traffic being processed (e.g., the entire PDU session and total packet flow in the session), the number of sessions and flows being processed, and the rate for each flow and each session being processed (e.g., session1=20 Mb/s, session2=40 Mb/s, Flow1=1 Mb/s, Flow2=5 Mb/s), and usage of each session and flow being processed.

In addition, the latency information of the communication interface may include unidirectional and bidirectional latency values, unidirectional/bidirectional latency values for each session and flow, and type of unidirectional and/or bidirectional data sizes (e.g., 64, 512, 1500 bytes), and type and number of traffic data errors for each session and flow.

In addition, the load information of the communication interface may include state information of a resource load (e.g., CPU/memory/storage) in UPF/SMF related to interface processing, state information of an interface load (e.g., interface N3, N6, N9) connected in UPF related to interface processing, state information of an interface load (e.g., interface Nsmf) connected in SMF related to interface processing, and event status information of an event, with respect to interface message types, e.g., PDR, QER, FAR, URR related to session generation/modification/deletion, etc.

Meanwhile, according to embodiment variations, the measuring device 110 may be implemented in a form included as a component of the network entity device 120 or in a form included as a component of the control plane device 130.

Further, in another embodiment, the measuring device 110 may be implemented to measure the state of the communication interface formed between a certain control plane device 130 on the network and another control plane device 130 and to provide information thereon.

The network entity device 120 refers to an apparatus that selects a packet processing function so that a network service suitable for a user's requirements can be provided. In particular, the network entity device 120 performs a function of selecting any one packet processing device 100 among the plurality of packet processing devices 100. The network entity device 120 may be implemented as a separate device as shown in FIG. 2, but it may also be implemented in a form included as a component of the control plane device 130. In this case, the network entity device 120 may be an SMF.

The network entity device 120 according to the present exemplary embodiment utilizes state information on a communication interface formed between the packet processing device 100 and the control plane device 130 as an index for selecting the packet processing device 100. To this end, the network entity device 120 may be implemented in the form of interworking with the measurement device 110. In this case, the network entity device 120 may additionally use the state information collected for other communication interfaces of the network entity device 120 as an index for selecting the packet processing device 100.

The network entity device 120 selects an optimal packet processing device for maximizing transmission efficiency with the control plane device 130 based on the state information on the communication interface for each packet processing device 100, which is received from the measuring device 110.

The network entity device 120 may perform a filtering procedure for the packet processing device 100 based on a predefined service policy and user requirements.

In another embodiment, the network entity device 120 may perform the selection operation on a packet processing function for each different one of control plane devices 130 based on state information on a communication interface formed between each different control plane device 130, which is received from the measurement device 110.

Figure 3:
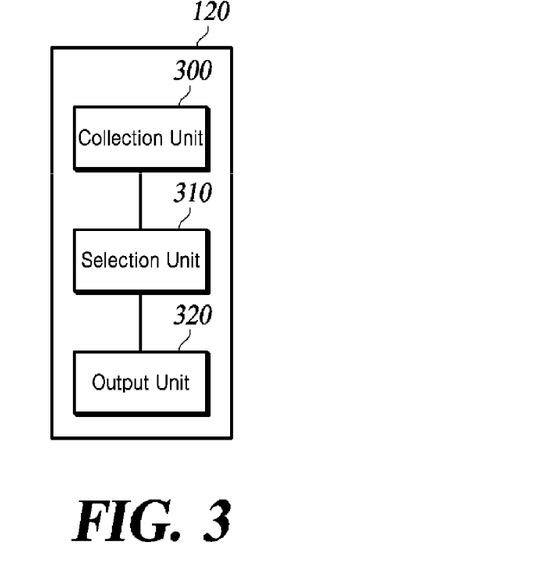
FIG. 3 is a schematic block diagram of a network entity device according to at least one embodiment of the present disclosure.

FIG. 3 will, in turn, present a detailed method performed by the network entity device 120 according to at least one embodiment for selecting the optimal packet processing device based on the state information of the communication interface.

The control plane device 130 refers to an apparatus that performs various functions for controlling a network and user equipment (UE). Such a control plane device 130 may be a certain device provided on the control plane area in the 5G core network shown in FIG. 1. For example, the control plane device 130 may be any one device of an access and mobility function (AMF) in charge of mobility management, a session management function (SMF) in charge of session management, and network functions (NFs) in charge of sharing network-related information with an external management plane.

Hereinafter, the control plane device 130 will be illustrated as being implemented by an SMF in charge of session management functions. In this case, defined as N4 I/F may be a reference point connecting the control plane device 130 and the packet processing device 100. In addition, the network entity device 120 selects the packet processing device 100 based on the state of the corresponding communication interface.

The control plane device 130 according to at least one embodiment receives information on the selection of the optimal packet processing device 100 from the network entity device 120, and based on this, it controls to perform the network service using the optimal packet processing device 100. To this end, the control plane device 130 may transmit a control signal related to the session connection to the packet processing device 100 corresponding to the selection information.

FIG. 3 is a schematic block diagram of a network entity device according to at least one embodiment of the present disclosure.

The network entity device 120 according to at least one embodiment includes a collection unit 300, a selection unit 310, and an output unit 320. At this time, the components included in the network entity device 120 according to at least one embodiment are not necessarily limited to these particular ones. For example, the network entity device 120 according to at least one embodiment may be implemented in a form that further includes the measurement device 110 shown in FIG. 2 as a component.

The collection unit 300 collects state information on the communication interface formed between the control plane device 130 and each of one or more packet processing devices 100 in the wireless communication network.

The collection unit 300 may communicate with the measuring device 110 provided for each packet processing device 100 and thereby receive, from each measuring device 110, the state information of the communication interface, which is measured for each packet processing device 100.

Meanwhile, the collection unit 300 may further receive state information of other communication interfaces of the packet processing device 100 through communication with the measuring device 110.

The collection unit 300 may collect state information on at least one of the states of a type, a speed, a latency, and a load of a communication interface formed between the control plane device 130 and each packet processing device 100.

The collection unit 300 may communicate with the measurement apparatus 110 to collect the state information of the communication interface at a request for a measurement of the same communication interface state information from an external management plane.

In another embodiment, the collection unit 300 may perform, upon recognition of user equipment accessing a base station in the wireless communication network, communication with the measurement apparatus 110 to collect the state information of the communication interface. For example, the collection unit 300 may collect the state information of the communication interface by performing communication with the measurement device 110 based on the recognition according to a subscriber's slice type, an IP address and a terminal device identification address, a service product policy matching the identification, a subscriber's specific local entry/exit policy, the subscriber's radio condition state (e.g., H/O related message), etc.

At least one embodiment does not limit the condition for the collection unit 300 to collect the communication interface state information by performing communication with the measurement device 110 to a specific condition.

The selection unit 310 refers to an apparatus for selecting a packet processing function so that a network service suitable for a user's requirements can be provided.

The selection unit 310 according to at least one embodiment determines the signal quality of the communication interface for each packet processing device 100 based on the state information of the communication interface for each packet processing device 100, which is received from the measuring device 110.

The selection unit 310 selects any one packet processing device among the plurality of packet processing devices 100 as an optimal packet processing device according to the signal quality determination result of the communication interface for each packet processing device 100.

According to at least one embodiment, the selection unit 310 may select a packet processing device having the maximum data transmission efficiency between the control plane device 130 as the optimal packet processing device according to the signal quality determination result. For example, the selection unit 310 may select, as an optimal packet processing device, such a packet processing device that produces such state information as including some or all of the parameters satisfying a preset threshold.

The selection unit 310 may perform a filtering procedure on the packet processing device 100 based on a predefined service policy and user requirements. For example, the selection unit 310 may select a final packet processing device that is optimized for a specific service or has a transmission speed of a preconfigured rate or more among candidate packet processing devices that satisfy a preset threshold.

On the other hand, the selection unit 310 may further utilize the state information collected for other communication interfaces of the packet processing device 100 in the process of selecting the packet processing device.

The output unit 320 outputs selection information on the optimal packet processing device selected by the selection unit 310 to the control plane device 130, for example, an SMF that is in charge of session management.

The output unit 320 may compare the state information of the optimal packet processing device selected by the selection unit 310 with the preset state information of the packet processing device and determine according to the comparison result whether to output the selection information.

Figure 4:
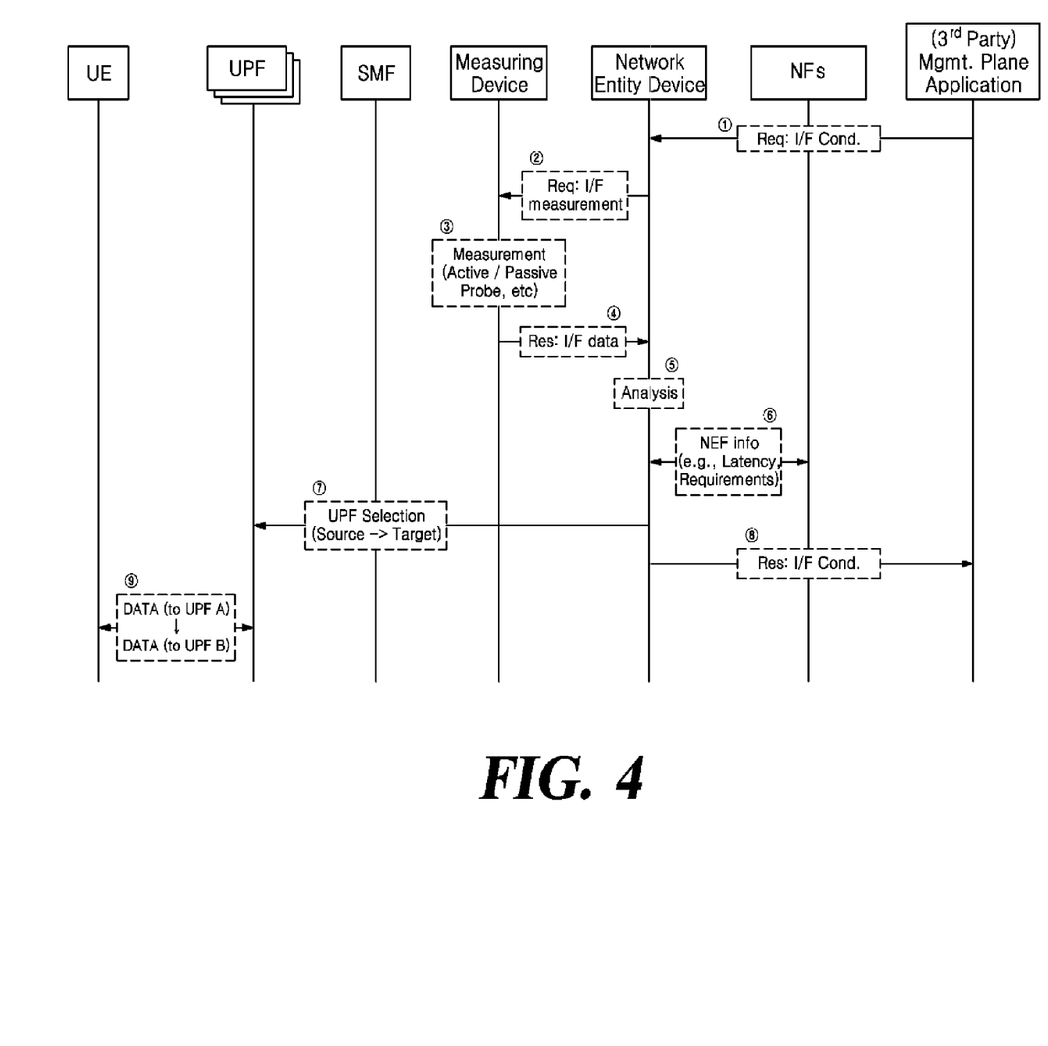
FIG. 4 is a flowchart for explaining a method of selecting a packet processing function according to at least one embodiment of the present disclosure.

FIG. 4 is a flowchart for explaining a method of selecting a packet processing function according to at least one embodiment of the present disclosure. As a side note, FIG. 4 illustrates that the packet processing device 100 and the control plane device 130 are implemented by UPF and SMF, respectively.

As shown in FIG. 4, the method of selecting a packet processing function according to at least one embodiment is composed of Steps ① to ⑨.

①, ② The network entity device 120 receives a request signal for state information of a communication interface transmitted through the NFs from an external management plane, and in response, it transmits the measurement signal for the communication interface state information to the measuring device 110. In Step ①, the external management plane may periodically transmit the request signal for the communication interface status information to the network entity device 120. The external management plane in another embodiment may transmit the request signal for the communication interface status information to the network entity device 120 upon confirmation of an update of the status of the packet processing device 100.

③, ④ The measuring device 110 measures in real-time the state of the communication interface formed between the packet processing device 100 and the control plane device 130 and transmits the information thereon to the network entity device 120.

⑤ The network entity device 120 analyzes the state information of the communication interface for each packet processing device 100, which is received in Step ④ and determines the signal quality of the communication interface for each packet processing device 100.

⑥ The network entity device 120 receives the predefined service policy and user requirements through the NFs.

⑦ The network entity device 120 selects any one packet processing device among the plurality of packet processing devices 100 as an optimal packet processing device based on the analysis result of Step ⑤ and the information received in Step ⑥. The network entity device 120 then outputs information on the selection to the control plane device 130.

In Step ⑦, the control plane device 130 transmits a control signal related to a session connection to the corresponding packet processing device 100 based on the received selection information. In this case, the control plane device 130 may transmit a control signal related to session release to a preset packet processing device when exists.

⑧ The control plane device 130 performs a session connection or session release procedure with the user equipment according to the control signal received in Step ⑦.

Figure 5:
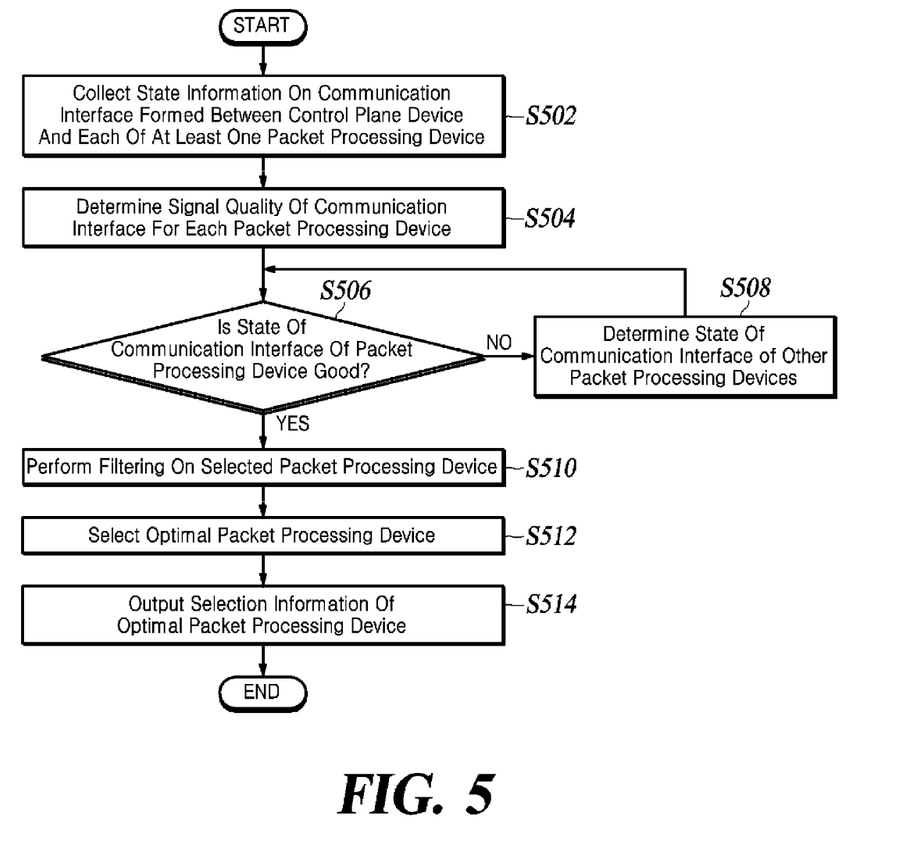
FIG. 5 is a flowchart for explaining a method performed by a network entity device for selecting a packet processing function according to at least one embodiment of the present disclosure.

FIG. 5 is a flowchart for explaining a method performed by a network entity device for selecting a packet processing function according to at least one embodiment of the present disclosure.

The network entity device 120 collects state information on the communication interface formed between the control plane device 130 and each of one or more packet processing devices 100 in the wireless communication network (S502).

The network entity device 120 determines the signal quality of the communication interface for each packet processing device 100 based on the communication interface state information for each packet processing device 100 collected in Step S502 (S504).

The network entity device 120 checks whether the state of the communication interface is good for each of the packet processing devices 100 according to the determination by Step S504 (S506 and S508).

The network entity device 120 performs a filtering procedure on the packet processing device selected according to the check result in Step S506 (S510). In Step S510, the network entity device 120 may perform a filtering procedure on the packet processing device 100 based on a predefined service policy and user requirements.

The network entity device 120 selects an optimal packet processing device for maximizing the transmission efficiency with the control plane device 130 according to the result of performing Steps S506 to S510 (S512).

The network entity device 120 outputs selection information of the optimal packet processing device selected in Step S512 (S514). In Step S514, the network entity device 120 may output the selection information to the control plane device 130, for example, the SMF in charge of the session management function.

Here, Steps S502 to S512 correspond to the operations of the respective components of the network entity device 120 described above, and further description thereof will be omitted.

Although the steps in FIG. 5 are described to be sequentially performed, they merely instantiate the technical idea of some embodiments of the present disclosure. Therefore, a person having ordinary skill in the pertinent art could appreciate that various modifications, additions, and substitutions are possible by changing the sequences in FIG. 5 or by performing two or more of the steps in parallel, and hence the steps in FIG. 5 are not limited to the illustrated chronological sequences.

As described above, the method of selecting a packet processing function illustrated in FIG. 5 may be implemented as a program and recorded on a computer-readable recording medium such as a CD-ROM, RAM, ROM, memory card, hard disk, magneto-optical disk, and storage device on which data that can be read by computer software are recordable.

Figure 6A:
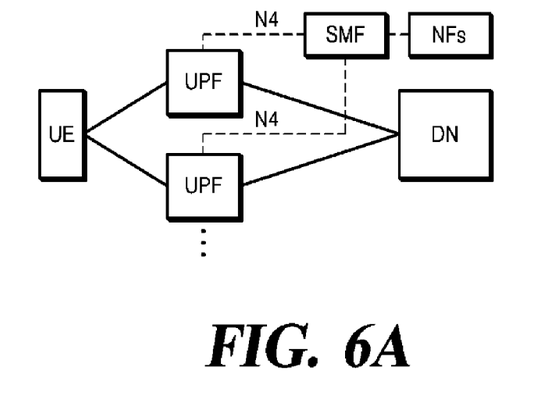
FIGS. 6A and 6B are comparative views for illustrating the effect by the method of selecting a packet processing function according to at least one embodiment of the present disclosure.
Figure 6B:
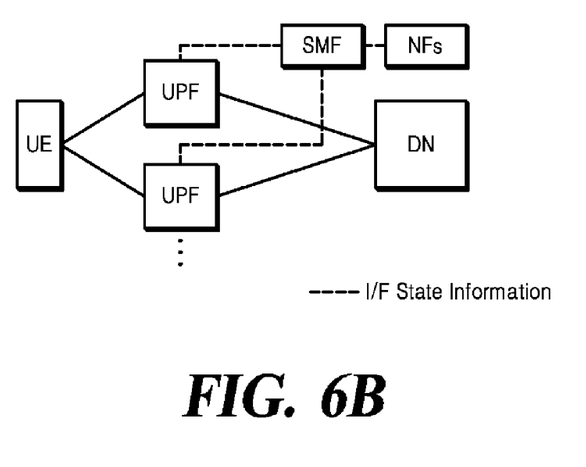

FIGS. 6A and 6B are comparative views for illustrating the effect by the method of selecting a packet processing function according to at least one embodiment of the present disclosure. FIG. 6A illustrates a conventional method of selecting a packet processing device and FIG. 6B illustrates the present method of selecting a packet processing device according to at least one embodiment.

In the conventional packet processing device selection method, an appropriate packet processing device is selected in consideration of regional information and policy information. However, the conventional packet processing device selection method extends no concern practically to address the performance delay that may occur in the signaling procedure between the packet processing device and the control plane and the resultant reduction of data transmission efficiency.

On the other hand, with the packet processing device selection method according to at least one embodiment, the state information of the communication interface formed between the packet processing device 100 and the control plane device 130 works as an index for selecting the packet processing device 100, whereby selecting the packet processing device 100 in consideration of both the signaling path and the data path.

This can maximize the QoS distribution and resource efficiency for various users, and at the same time, the ultrafast selection of packet processing device 100 makes it easier for users to receive high-quality network services.

Although exemplary embodiments of the present disclosure have been described for illustrative purposes, those skilled in the art will appreciate that various modifications, additions, and substitutions are possible, without departing from the idea and scope of the claimed invention. The presented embodiments are for illustrative purposes and not to be considered as limitations of the present disclosure. The scope of the technical idea of the present embodiments is not limited by the illustrations. Accordingly, one of ordinary skill would understand the scope of the claimed invention is not to be limited by the above explicitly described embodiments but by the claims and equivalents thereof.

REFERENCE NUMERALS

| 100: packet processing device | 110: measuring device |
|---|---|
| 120: network entity device | 130: control plane device |
| 300: collection unit | 310: selection unit |
| 320: output unit | |

CROSS-REFERENCE TO RELATED APPLICATION

This application claims priority under 35 U.S.C § 119(a) of Patent Application No. 10-2017-0135219, filed on Oct. 18, 2017 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A network entity device, comprising:
a processor; and
memory storing instructions thereon, the instructions when executed by the processor cause the processor to:
collect, in real-time, state information of a communication interface formed between a control plane device and each of one or more packet processing devices in a wireless communication network, the control plane device separate from a user plane device and implementing at least one of an access and mobility function (AMF) associated with mobility management, a session management function (SMF) associated with session management or network functions (NFs) associated with sharing network-related information with an external management plane;
determine signal quality of the communication interface for each of the packet processing devices based on the state information, the determined signal quality indicative of transmission efficiency of each of the packet processing devices with respect to the control plane device;
select any one of the packet processing devices having a highest transmission efficiency with respect to the control plane device; and
output selection information of a selection of the one packet processing device.

2. The network entity device of claim 1, wherein the state information indicates at least one of a type, a speed, a latency, or a load of the communication interface for each of the packet processing devices.

3. The network entity device of claim 1, wherein the instructions further cause the processor to collect additional state information of other communication networks connected to the packet processing device, and
select the one packet processing device by further utilizing the additional state information of the other communication networks.

4. The network entity device of claim 1, wherein the state information is collected when a measurement of the state information of the communication interface is requested by the control plane device implementing the network functions or when a user equipment accessing a base station in the wireless communication network is recognized.

5. The network entity device of claim 1, wherein the instructions further cause the processor to perform a filtering procedure on the packet processing device based on requirement from predefined service and user policy.

6. The network entity device of claim 1, wherein the the instructions further cause the processor to make a comparison of the state information of the one packet processing device with the state information of a preset packet processing device, and to determine whether to output the selection information according to a result of the comparison.

7. The network entity device of claim 1, wherein the instructions to further cause the processor to measure the state information of the communication interface for each of the packet processing devices.

8. The method of claim 1, wherein the selecting comprises:
performing a filtering procedure on the packet processing device based on requirement from predefined service and user policy.

9. A method performed by a network entity device for selecting one of packet processing devices, the method comprising:
collecting, in real-time, state information of a communication interface formed between a control plane device and each of one or more packet processing devices in a wireless communication network, the control plane device separate from a user plane device and implementing at least one of an access and mobility function (AMF) associated with mobility management, a session management function (SMF) associated with session management or network functions (NFs) associated with sharing network-related information with an external management plane;

determining signal quality of the communication interface for each of the packet processing devices based on the state information, the determined signal quality indicative of transmission efficiency of each of the packet processing devices with respect to the control plane device;

selecting any one of the packet processing devices having a highest transmission efficiency with respect to the control plane device; and outputting selection information of a selection of the one packet processing device.

10. The method of claim 9, further comprising:

measuring the state information of the communication interface for each of the packet processing devices.

* * * * *